US005825374A

United States Patent [19]

Albertalli et al.

[11] Patent Number: 5,825,374

[45] Date of Patent: Oct. 20, 1998

[54] APPARATUS AND METHOD FOR ADVANCING A WEB

[75] Inventors: David Albertalli, San Jose; Gus Andriancen, Santa Clara; Sasan Saadat, Hayward, all of Calif.

[73] Assignee: Raster Graphics, Inc., San Jose, Calif.

[21] Appl. No.: 815,133

[22] Filed: Mar. 12, 1997

[51] Int. Cl.[6] .......................... G01D 15/26; B65H 20/00; B65H 23/18; B65H 77/00

[52] U.S. Cl. ....................... 346/136; 226/156; 242/412.2; 242/414.1; 242/417.3

[58] Field of Search .............................. 242/412.2, 412.3, 242/535.2, 352.2; 226/95, 156, 148, 115; 347/104; 346/136; 400/662

[56] References Cited

U.S. PATENT DOCUMENTS

| | | | |
|---|---|---|---|
| 3,389,399 | 6/1968 | Kennedy | 226/115 X |
| 3,491,968 | 1/1970 | Jennings et al. | 242/412.2 X |
| 3,512,733 | 5/1970 | Ault | 242/412.2 X |
| 3,904,145 | 9/1975 | Steinberger et al. | 242/412.2 |
| 4,100,470 | 7/1978 | Andrews | 346/136 X |
| 4,454,517 | 6/1984 | Kagaya | 346/136 |
| 4,463,361 | 7/1984 | Koumura et al. | 347/104 X |
| 4,966,333 | 10/1990 | Bosch | 242/412.3 |
| 4,992,805 | 2/1991 | Yoshizawa et al. | 346/136 X |
| 5,124,728 | 6/1992 | Denda | 347/104 |
| 5,321,467 | 6/1994 | Tanaka et al. | 347/104 X |
| 5,474,245 | 12/1995 | Gunday et al. | 242/412.2 X |

FOREIGN PATENT DOCUMENTS

| | | | |
|---|---|---|---|
| 165361 | 5/1953 | Australia | 226/115 |

*Primary Examiner*—Michael Mansen
*Attorney, Agent, or Firm*—Burns, Doane, Swecker & Mathis LLP

[57] ABSTRACT

In an apparatus for intermittently advancing a web, only one surface of the web contacts moving parts of the apparatus. The apparatus includes, in a direction of movement of the web, a device for supplying the web, a first dancer roller arrangement, an intermittently driven drive roller, a second dancer roller arrangement, and a take-up device. The first and second dancer roller arrangements function to isolate a portion of the web from inertia in other portions of the web, and to provide substantially constant tension on opposite sides of the drive roller to prevent slippage and ensure accurate intermittent advancement of the web by the drive roller. A method for intermittently advancing a web is also disclosed.

22 Claims, 6 Drawing Sheets

APPARATUS AND METHOD FOR ADVANCING A WEB

BACKGROUND OF THE INVENTION

1. Field of the Invention

The present invention relates to an apparatus and method for intermittently advancing a web and, more particularly, for intermittently advancing a web without contacting one surface of the web.

2. Background and Summary of the Invention

Well known desk top-type ink jet printing apparatus perform a printing operation on a single sheet of, for example, 8½"×11" paper. A printer carriage carrying printer heads is moved laterally across the sheet of paper left-to-right and right-to-left and, on one of the lateral movements, an ink jet is laid down on the paper. The paper is advanced incrementally, such as by a pair of driven rollers, after each back and forth movement of the carriage and another ink jet is laid down. In color printing, usually between four and six different colors are laid down by multiple heads in successive sweeps across the paper. In such apparatus, because of the small size of the paper, the speed of the operation is not generally crucial.

It is not uncommon in such apparatus for quality to be compromised by imperfect advancement of the paper through the printer. If the paper advance is less than or greater than intended, distortion in the image created will occur. It is also not uncommon for quality to be compromised by deviations from the norm in terms of distance of the printer heads from the paper because the paper is generally loosely held in place relative to the heads. For the casual user or for printing textual material, these matters are usually not of great concern.

The present invention is particularly well-suited for use with substantially more sophisticated ink jet printers than desk top models. With these ink jet printers, it is desirable to produce extremely high quality images, on wide webs of paper, and at very fast printing rates. The requirements of these apparatus in terms of accuracy of paper feed, methods of paper feed, and print head to paper distance are much higher than in conventional ink jet printers and pose problems not encountered in conventional printers.

One problem encountered with the more sophisticated printers involves the use of paper webs in the form of rolls. The paper is supplied in the form of a heavy roll that must be incrementally advanced so that the printer can print on successive stationary portions of the web, and then the paper must be rolled back up into another roll. Both the supply roll and the take-up roll are usually quite heavy and, when the rolls are rotated, they have a very high inertia. It is necessary to isolate the portion of the web upon which the printing operation is to be performed from the inertia of the rolls.

Another problem encountered with the more sophisticated printers involves the problem of how to advance the web and, more particularly, how to incrementally advance the web. In the past, pinch rollers have been used. However, pinch rollers are not well-suited for applications such as ink jet printing where it is desirable to not contact the surface of the web upon which the printing operation has been performed. Thus, it is desirable to provide an apparatus for advancing a web that does not require contact of a surface of the web.

Where it is desired to print with multiple printer heads over a large area of a sheet or web, still another problem encountered relates to the need to hold the sheet or web very flat over a large surface area. A distance from a printer head carriage carrying the multiple printer heads to the sheet or web must be as precise as possible to ensure high quality printing. In conventional printers, only small areas are printed in each sweep of the printer head, and it is not difficult to hold the small area in position relative to the printer head carriage. As the area that is printed by the printer heads on the carriage becomes larger, it becomes progressively more difficult to ensure that all of the portions of the sheet or web are at the precise desired distance from the printer heads.

The present invention, generally speaking, provides an apparatus and method for intermittently advancing a web that overcomes various problems and provides various advantages. The apparatus and method isolates a portion of a web from inertia in other portions of the web. The apparatus and method permits incremental advancement of the web while only contacting one surface of the web. The apparatus and method permits a precise distance to be maintained between a large area of a web to be printed and multiple printer heads. The apparatus and method is well-suited for high quality, high speed ink jet printing operations.

In accordance with one aspect of the invention, an apparatus for intermittently advancing a web is disclosed. The apparatus includes a driven supplying device for supplying a web of material. The apparatus includes a driven take-up device for taking up the web of material. The apparatus includes an intermittently driven drive roller between the supplying device and the take-up device. A first surface of the web contacts the drive roller such that intermittent movement of the drive roller advances the web toward the take-up device. The intermittent movement of the drive roller advances the web. A first dancer roller arrangement is provided between the drive roller and the supplying device. The first dancer roller arrangement includes a first pivot point, a first roller pivotable about the first pivot point between a first and a second position, and a first urging device for urging the first roller toward the first position. The first surface of the web contacts the first roller. A second dancer roller arrangement is provided between the drive roller and the take-up device. The second dancer roller arrangement includes a second pivot point, a second roller pivotable about the second pivot point between a first and a second position, and a second urging device for urging the second roller toward the first position. The first surface of the web contacts the second roller. When the drive roller advances the web, a length of the web between the supplying device and the drive roller decreases and causes the first roller to move toward the second position of the first roller against a force from the first urging device and a length of the web between the drive roller and the take-up device increases such that the second urging device moves the second roller to the first position of the second roller. When the supplying device supplies the web, a length of the web between the supplying device and the drive roller increases such that the first urging device moves the first roller to the first position of the first roller. When the take-up device takes up the web, a length of the web between the drive roller and the take-up device decreases and causes the second roller to move toward the second position of the second roller against a force from the second urging device.

According to another aspect of the invention, an apparatus for intermittently advancing a web is provided. The apparatus includes a driven supplying device for supplying a web of material. The apparatus includes a driven take-up device for taking up the web of material. The apparatus includes an intermittently driven drive roller between the supplying device and the take-up device. A first surface of the web contacts the drive roller such that intermittent movement of the drive roller advances the web away from the supply device and toward the take-up device. The intermittent movement of the drive roller advances the web. A first tensioning device is disposed between the drive roller and the supplying device and contacts the first surface of the web such that substantially constant tension is maintained in the web during intermittent movement of the drive roller and during no intermittent movement of the drive roller. A second tensioning device is disposed between the drive roller and the take-up device and contacts the first surface of the web such that substantially constant tension is maintained in the web during intermittent movement of the drive roller and during no intermittent movement of the drive roller.

According to still another aspect of the present invention, a method for intermittently advancing a web is disclosed. According to the method, a web of material is supplied from a supply point. The web of material is taken up at a take-up point. A portion of the web between the supply point and the take-up point is intermittently moved away from the supply point and toward the take-up point and movement of the web is stopped with a drive device. Substantially constant tension is maintained in a portion of the web between the drive device and the supply point during intermittent movement of the web and during no intermittent movement of the web with a first tensioning device. Substantially constant tension is maintained in a portion of the web between the drive device and the take-up point during intermittent movement of the web and during no intermittent movement of the web with a second tensioning device.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
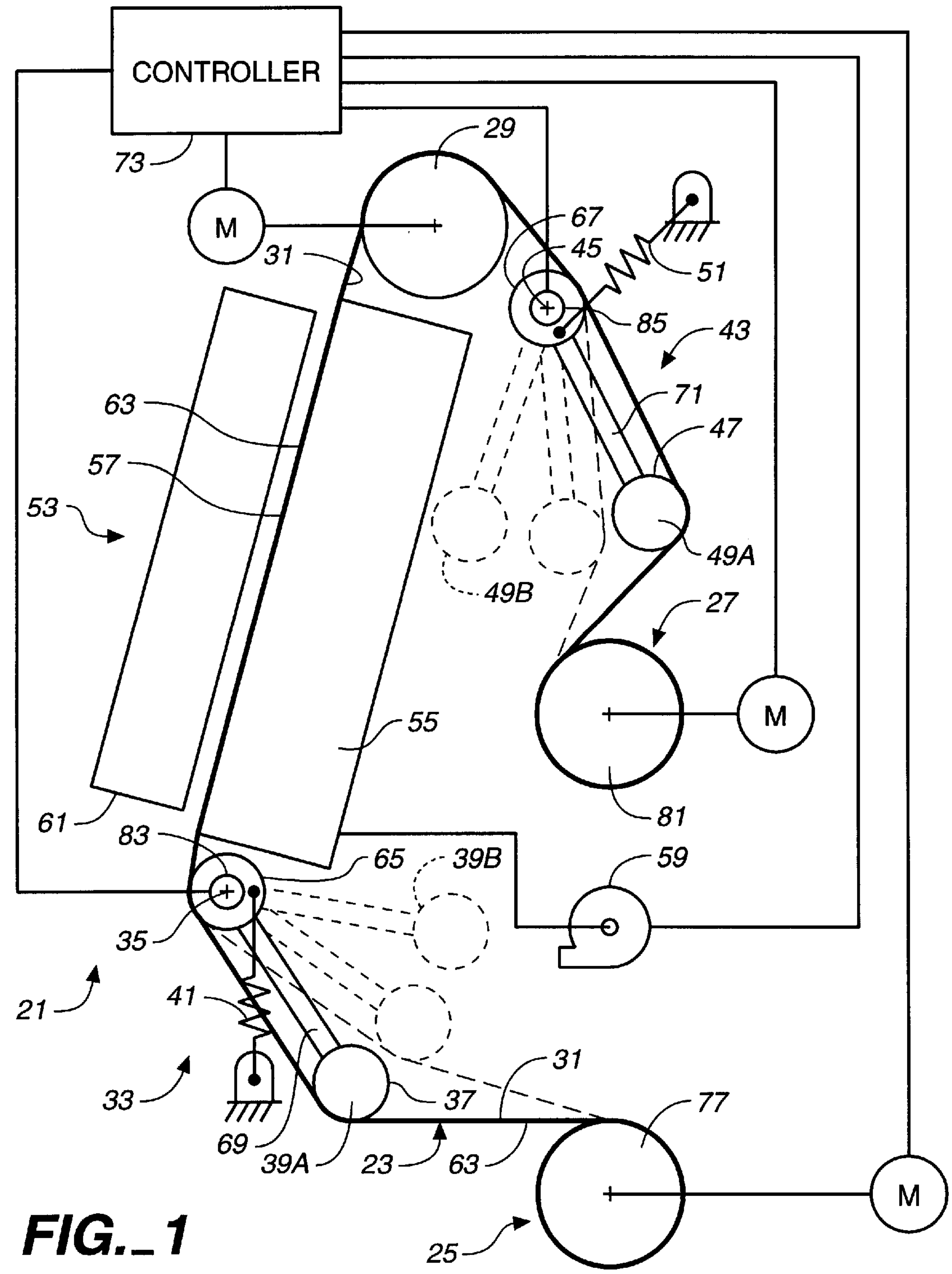
FIG. 1 schematically shows an apparatus for intermittently advancing a web according to an embodiment of the present invention.
Figure 2:
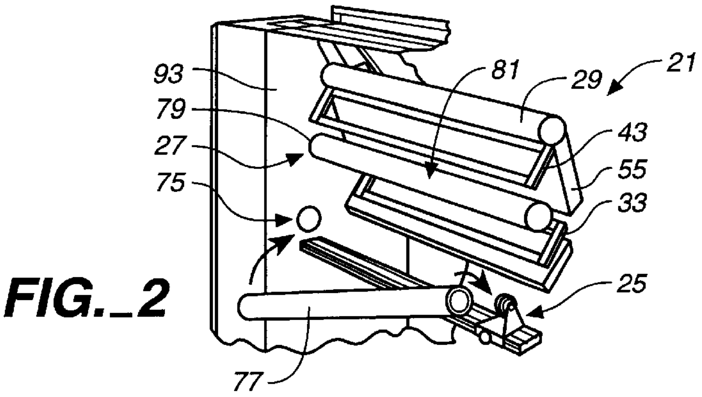
FIG. 2 is a partially broken rear perspective view of an apparatus for intermittently advancing a web according to an embodiment of the present invention.
Figure 3:
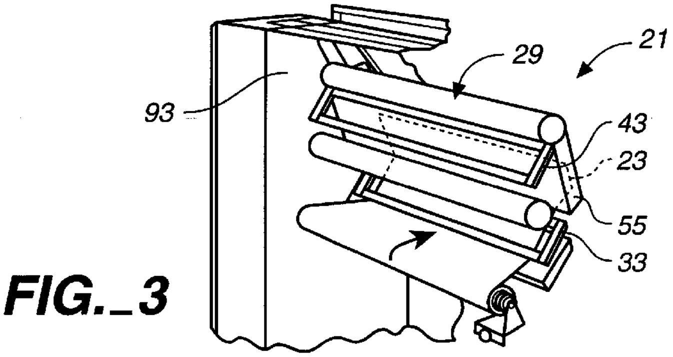
FIG. 3 is a partially broken rear perspective view of an apparatus for intermittently advancing a web according to an embodiment of the present invention.
Figure 4:
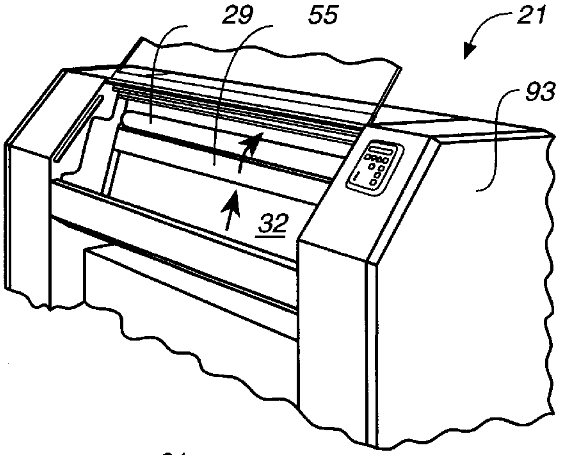
FIG. 4 is a partially broken front perspective view of an apparatus for intermittently advancing a web according to an embodiment of the present invention.
Figure 5:
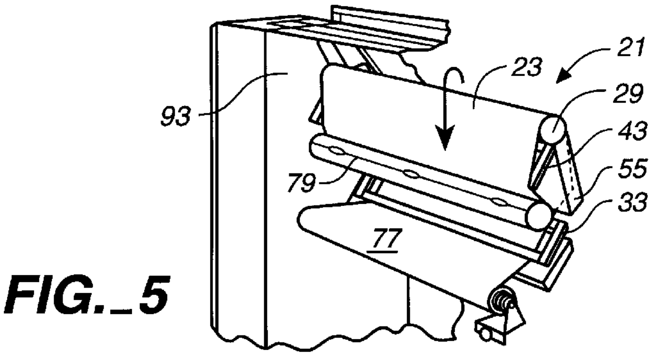
FIG. 5 is a partially broken rear perspective view of an apparatus for intermittently advancing a web according to an embodiment of the present invention.

An apparatus 21 according to an embodiment of the present invention for intermittently advancing web 23 is shown in FIGS. 1–5. The apparatus 21 includes a driven supplying device 25 for continuously or, preferably, intermittently supplying the web of material 23. A driven take-up device 27 is provided for continuously or, preferably, intermittently, taking up the web of material 23. FIGS. 2–5 show, in perspective, how the web 23 is threaded through the apparatus 21 from the supplying device 25 to the take-up device 27, with FIGS. 2–3 and 5 showing the apparatus from the rear and FIG. 4 showing the apparatus from the front.

An intermittently driven drive roller 29 is disposed between the supplying device 25 and the take-up device 27. A first surface 31 of the web 23 contacts the drive roller 29 such that intermittent movement of the drive roller advances the web toward the take-up device 27. If the supplying device 25 and the take-up device 27 continuously supply and take-up the web, respectively, the intermittent movement of the drive roller 29 advances the web 23 at a rate that is faster than the supply rate and the take-up rate.

A first dancer roller arrangement 33 is disposed between the drive roller 29 and the supplying device 25. The first dancer roller arrangement 33 is mounted relative to the apparatus 21 at a first pivot point 35 and includes a first roller 37 that is pivotable about the first pivot point between a first and a second position 39A and 39B, respectively. The first dancer roller arrangement 33 also includes a first urging device 41, such as a compression or tension spring or a hydraulic or pneumatic piston, for urging the first roller 37 toward the first position 39A. The first surface 31 of the web 23 contacts the first roller 37.

A second dancer roller arrangement 43 is disposed between the drive roller 29 and the take-up device 27. The second dancer roller arrangement 43 is mounted relative to the apparatus 21 at a second pivot point 45 and includes a second roller 47 that is pivotable about the second pivot point between a first and a second position 49A and 49B, respectively. The second dancer roller arrangement 43 also includes a second urging device 51, such as a compression or tension spring or a hydraulic or pneumatic piston, for urging the second roller 47 toward the first position 49A. The first surface 31 of the web 23 contacts the second roller 47.

Figure 6:
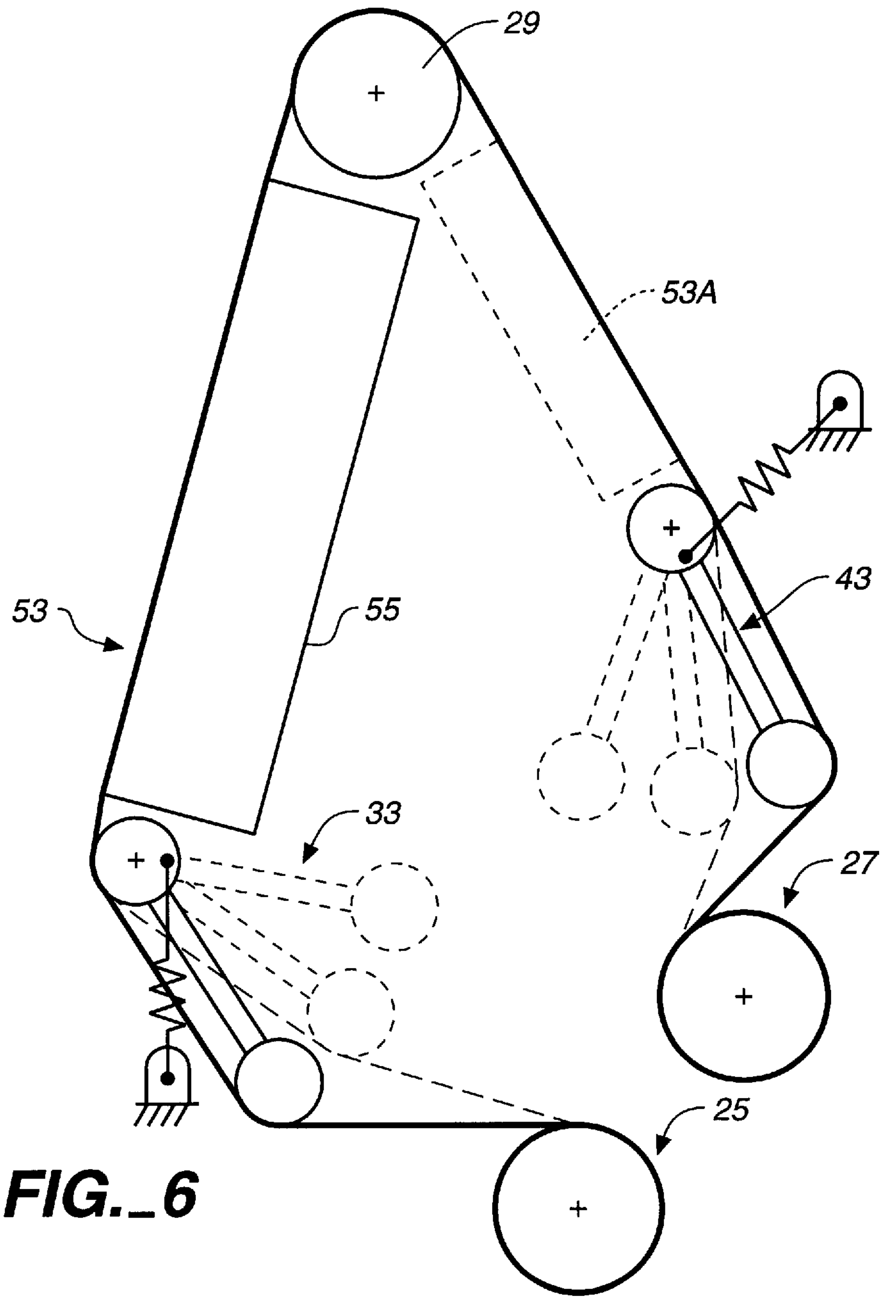
FIG. 6 is a schematic view of an apparatus for intermittently advancing a web according to a second embodiment of the present invention.

A station 53 for performing an operation on the web 23 is preferably disposed between at least one of the first dancer roller 33 arrangement and the drive roller 29 and the second dancer roller arrangement 43 and the drive roller. In the embodiment shown in FIG. 1, the station 53 is disposed between the first dancer roller arrangement 33 and the drive roller 29. A station 53A is shown in FIG. 6 in dotted lines to represent where the station might be positioned between the driver roller and the second dancer roller arrangement 43 in addition to or instead of the station 53.

In a presently preferred application of the apparatus 21 as seen in FIG. 1, the apparatus is part of an ink jet printing apparatus, the web 23 is a paper web, and the station 53 includes a vacuum platen 55 having a flat surface 57, which is preferably perforated. The vacuum platen 55 is preferably a rectangular box with the perforated flat surface 57 forming one side of the box. A suitable method and apparatus for making a vacuum platen is disclosed in commonly-assigned U.S. patent application Ser. No. 08/815,129, (Attorney Docket No. 031228-005), entitled Method for Reinforcing a Flexible Sheet, which is hereby incorporated by reference.

The first surface 31 of the web 23 is preferably held against the flat surface 57 by a constant vacuum from a vacuum source 59 such as a blower connected to the interior of the box-shaped vacuum platen 55. The strength of the vacuum source 59 is preferably adjustable to regulate tension in the web 23 between the vacuum platen 55 and the drive roller 29 so that the web is firmly held in position on the vacuum platen when the drive roller is stationary, but is slidable relative to the vacuum platen when the driver roller is intermittently driven. The vacuum source 59 is preferably an AC blower in combination with an SCR circuit for changing power levels to the blower. A sensor, such as an optical sensor, is preferably provided at some point along the path of the web, such as proximate the supplying device 25, to detect a width of the web 23 and the power of the vacuum source 59 is preferably automatically adjusted depending upon the width of the web. The supplying device 25 or the take-up device may, alternatively, be equipped with a suitable sensor for detecting a width of a roll mounted thereon, such as by sensing a position of a movable reel on which the roll is mounted. For example, when a narrow web 23 is being used, and there are a large number of uncovered holes on the vacuum platen 55, the power of the vacuum source 59 must be higher to maintain a sufficient vacuum force on the web than when the web covers substantially all of the holes.

The station 53 preferably includes a printer carriage 61 that is moved laterally with respect to a direction of movement of the web 23 and is disposed at a distance from the vacuum platen for printing on a second surface 63 of the web. In a particularly preferred embodiment, the printer carriage 61 performs a printing operation as it moves left to right across the web 23 and also as it moves right to left. It will be appreciated that a station for performing an ink jet printing operation is only one of many possible stations that might be provided. The vacuum platen 55 permits a large area of the web 23 to be held very flat against the flat surface 57, thereby ensuring that a precise distance between the printer heads on the carriage 61 is maintained. A printer carriage suitable for use in connection with the present invention is disclosed in commonly-assigned U.S. patent application Ser. No. 08/815,132, entitled Ink Supply Apparatus, which is hereby incorporated by reference. A printer head mounting configuration and a method of precision mounting printer heads on a carriage is disclosed in commonly-assigned U.S. patent application Ser. No. 08/815,590, now U.S. Pat. No. 5,782,184, entitled Printer Head Carriage and Method for Aligning Printer Heads on a Printer Head Carriage, which is hereby incorporated by reference.

Two important functions of the first and second dancer roller arrangements 33 and 43 are that they isolate the inertia of a portion of the web 23 between the supplying device 25, which typically supplies the web from a roll of material, and the take-up device, which typically winds the web back into a roll, and the maintenance of tension on opposite sides of the drive roller 29 so that no slippage occurs. The rolls of web material typically have a large inertia and in order to perform an operation on the web at the station 53 it is necessary to isolate the inertia of the portion of the web upon which the operation is to be performed. The apparatus 21 is particularly well-suited for performing operations in precise locations on webs because the web 23 can be moved a large yet precise distance by the drive roller 29 because there is sufficient tension on opposite sides of the drive roller that is maintained by the dancer roller arrangements.

Further, the apparatus 21 permits the web 23 to remain in position for a long length of time between very brief and precise advancing steps. This permits performing a relatively complex operation at the station. For example, it is presently contemplated that, when the apparatus 21 is used in conjunction with an ink jet printing operation, a paper web will be advanced 0.62 inches or 0.31 inches (15.75 mm or 7.87 mm) approximately once every second or one and one half seconds, with only 300 microseconds of that time being devoted to actually advancing the web, and the rest of the time being devoted to performing a printing operation.

It will be noted that the apparatus 21 avoids having any rollers in contact with the second surface 63 of the web 23, thereby avoiding smearing of ink printed on the web or, when other operations are performed on the web, avoiding damage to the web on which the operation has been performed. Because the apparatus 21 permits holding stationary a portion of a web where the web is supplied from one point and taken up at another point, the apparatus is particularly well-suited for applications wherein it is desirable to perform an operation on a web in a manner wherein the operation is performed laterally across the web, just as ink-jet printing.

The first dancer roller arrangement 33 preferably includes a third roller 65 that is coaxial with or at least substantially coaxial with the first pivot point 35. Similarly, the second dancer roller arrangement 43 preferably includes a fourth roller 67 that is coaxial with or at least substantially coaxial with the second pivot point 45. The first surface 31 of the web 23 contacts the third and fourth rollers 65, 67. The third roller 65 is preferably connected to the first roller 37 by a rigid member 69 such as one or more connecting bars. Similarly, the fourth roller 67 is preferably connected to the second roller 47 by a rigid member 71 such as one or more connecting bars.

Supplying of the web 23 by the supplying device 25 and taking-up of the web by the take-up device 27 are preferably controllable by one or more controllers 73. The supplying device 25 preferably includes a first driven reel 75 upon which the web 23 is mounted in the form of a roll 77 of material in order to be unwound to supply the web of material. The take-up device 27 preferably includes a second driven reel 79 upon which the web of material is wound to form a roll 81.

A presently preferred arrangement for controlling the supply device 25 and the take-up device 27 controls the first reel 75 and the second reel 79 in response to signals generated by one or more signal generating devices, the signals corresponding to positions of the first and second rollers 37 and 47 as they are moved toward their respective second positions 39B and 49B. More particularly, a first signal generating device 83 is provided for generating a signal corresponding to a position of the first roller 37 between the first and second position 39A and 39B of the first roller, and a second signal generating device 85 is provided for generating a signal corresponding to a position of the second roller 47 between the first and second position 49A and 49B of the second roller.

Figure 7:
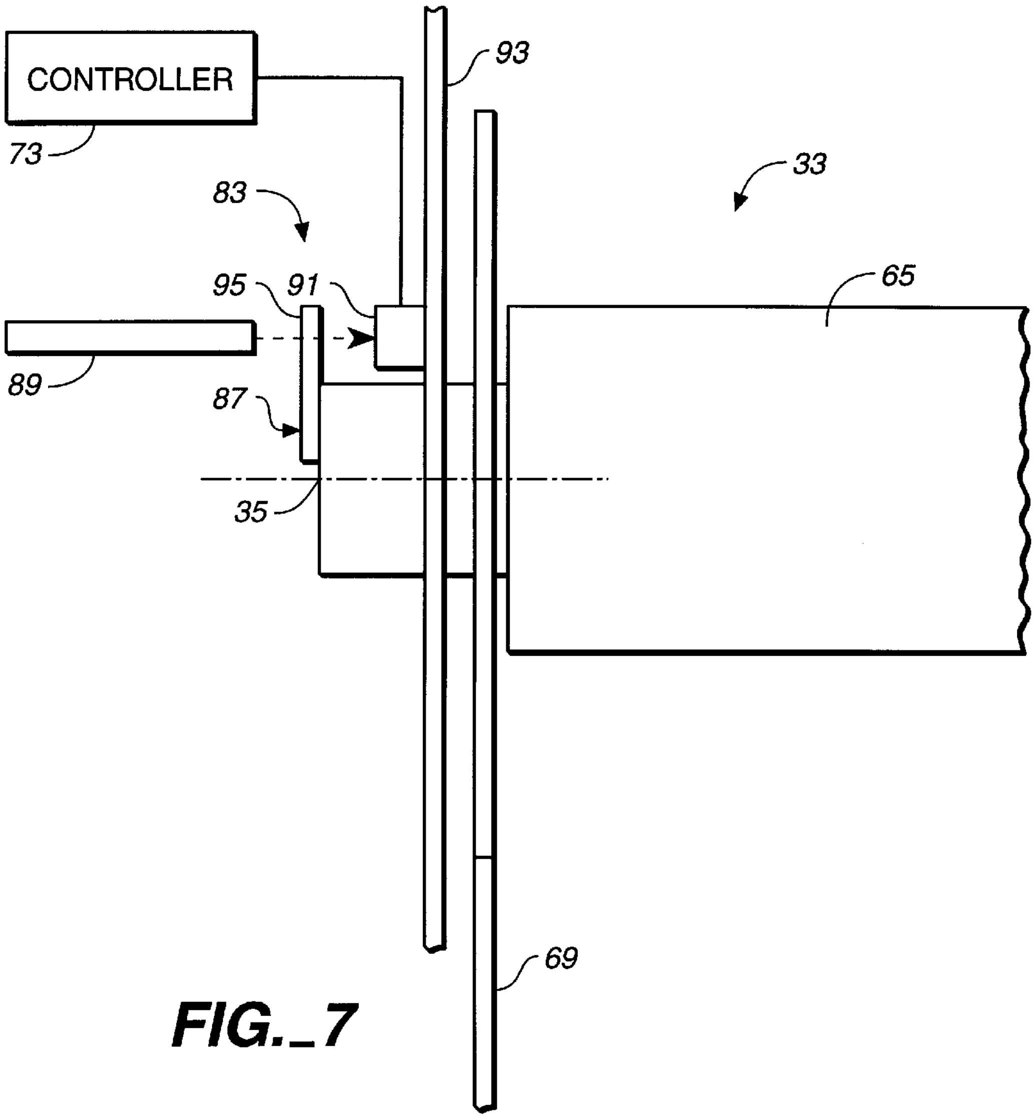
FIG. 7 is a schematic top view of a signal generating device used in an apparatus for intermittently advancing a web according to an embodiment of the present invention.

The first signal generating device 83 is preferably structured the same as the second signal generating device 85. The first signal generating device 83 is preferably a grayscale sensor mounted relative to the first pivot point 35 and the second signal generating device 85 is preferably a grayscale sensor mounted relative to the second pivot point 45. The signal generating device 83 including a grayscale sensor 87 suitable for use as the first signal generating device 83 and as the second signal generating device is shown in FIG. 7 for purposes of illustration. The grayscale sensor 87 is a combination of elements including a light source 89 for generating a beam of light having a first intensity and an optical sensor 91 for detecting light at different intensities and generating signals corresponding to one or more of the intensities. The light source 89 and the optical sensor 91 are preferably fixed in position relative to each other on a frame 93 of the apparatus 21 proximate the third and fourth rollers 65 and 67.

A disk 95 of a material that is generally transparent to the light generated by the light source 89 is preferably circular or an arc of a circle and is preferably shaded, such as by a dye. At one point on the circular disk 95, the disk is entirely transparent, at another point on the circle, the disk is entirely or nearly entirely opaque, and, at points in between the transparent point and the opaque point, the transparency of the disk steadily decreases and the opacity steadily increases. The disk 95 is mounted on, for example, the third roller 65 or an extending shaft thereof so that a center of rotation of the circular disk is coaxial with the third roller.

Figure 8A:
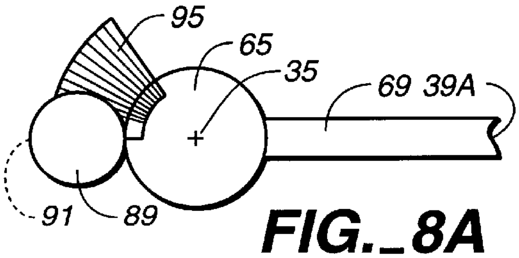
FIGS. 8A and 8B are schematic side views of parts of a signal generating device used in an apparatus for intermittently advancing a web according to an embodiment of the present invention.
Figure 8B:
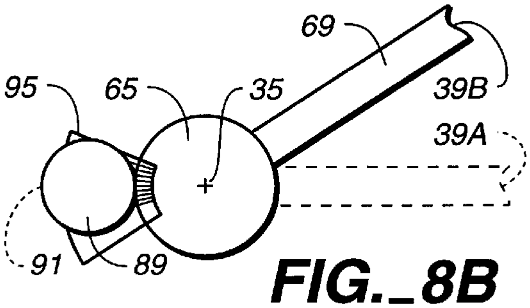

Light from the light source 89 passes through the disk 95 before it is detected by the sensor 91. Depending upon the intensity of the light detected by the sensor 91, the angular position of the first and second dancer roller arrangements 33 and 43 can be determined. For example, as seen in FIGS. 8A–8B, the first dancer roller arrangement 33 pivots through a known angle between the first and second positions 39A and 39B, and the disk 95 is preferably shaded so that, when the first roller 37 is in the first position, a portion of the disk having a first transparency is disposed between the light source 89 and the sensor 91 and, when the first roller is in the second position, a portion of the disk having a second transparency is disposed between the light source and the sensor. The sensor 91 can be arranged to continuously generate signals corresponding to an intensity of light detected so that the angular position of the first dancer roller arrangement is continuously monitored as a more or less transparent portion of the disk 95 is disposed between the light source 89 and the sensor. The sensor 91 may, instead, be arranged to generate a signal, or stop generating a signal, when transparency of the disk falls below a desired level, indicating that the first dancer roller arrangement 33 is in a particular angular position.

Operation of the supply device 25 and the take-up device 27 is preferably controlled by signals generated by the signal generating devices 83 and 85 associated with the first dancer roller arrangement 33 and the second dancer roller arrangement 43, respectively. The supply device 25 is preferably not rotated until the signal generating device 83 associated with the first dancer roller arrangement 33 indicates that the first roller 37 is in a particular position between the first and second positions 39A and 39B, and is then operated until enough slack has been provided so that the first urging device 41 moves the first roller to another position between the first and second positions. The take-up device 27 is preferably not operated until sufficient slack is created by movement of the drive roller 29 to move the second roller 47 to a position between the first and second positions of the second roller 49A and 49B, and is then operated until the slack is taken up and the second roller is moved against the force of the second urging device 51 to another position between the first and second position of the second roller.

Instead of generating signals only when the dancer roller arrangements are in particular angular positions, the signal generating devices 83 and 85 may continuously generate signals corresponding to the angular position of the dancer roller arrangements and, when the first signal generating device generates a signal corresponding to a particular angular position, the controller 73 adjusts the speed of or an amount of material supplied or taken-up by the first reel 75 or the second reel 79 accordingly.

Figure 9:
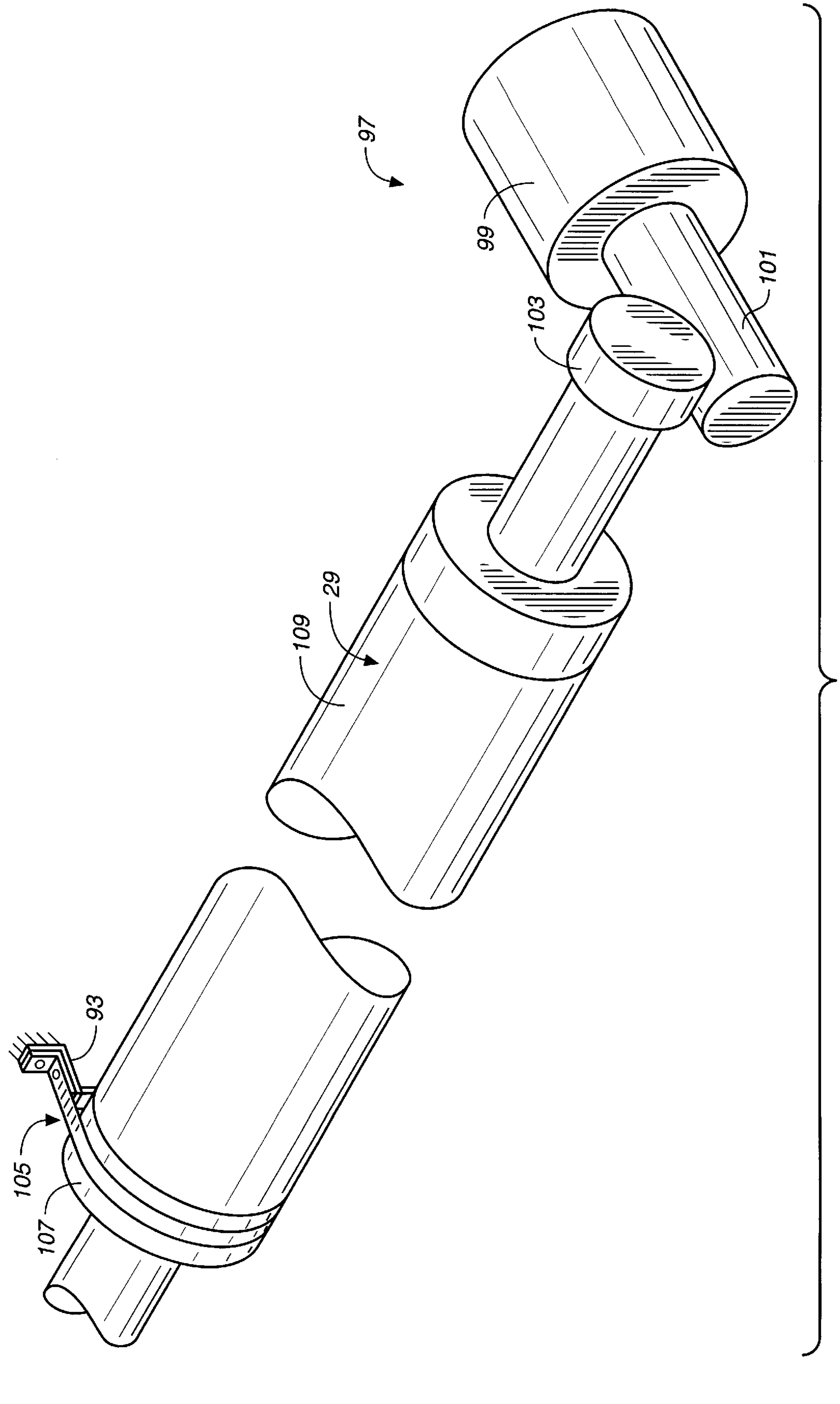
FIG. 9 is a schematic perspective view of a drive device for an apparatus for intermittently advancing a web according to an embodiment of the present invention.

The drive roller 29 preferably includes a step motor arrangement 97 for intermittently driving the drive roller through a predetermined angular distance. As seen in FIG. 9, the step motor arrangement 97 preferably includes a motor 99 that is regularly cycled between an operating and a non-operating condition, a worm gear 101 mounted on a shaft of the motor, and a gear meshing 103 with the worm gear and mounted on a shaft of the drive roller 29. Such an arrangement is preferred because an inexpensive motor 99, such as a 2¼ frame size motor, can be stepped up a great deal by the worm gear. Other types of motor arrangements may, however, be used as drives for the drive roller.

Figure 10:
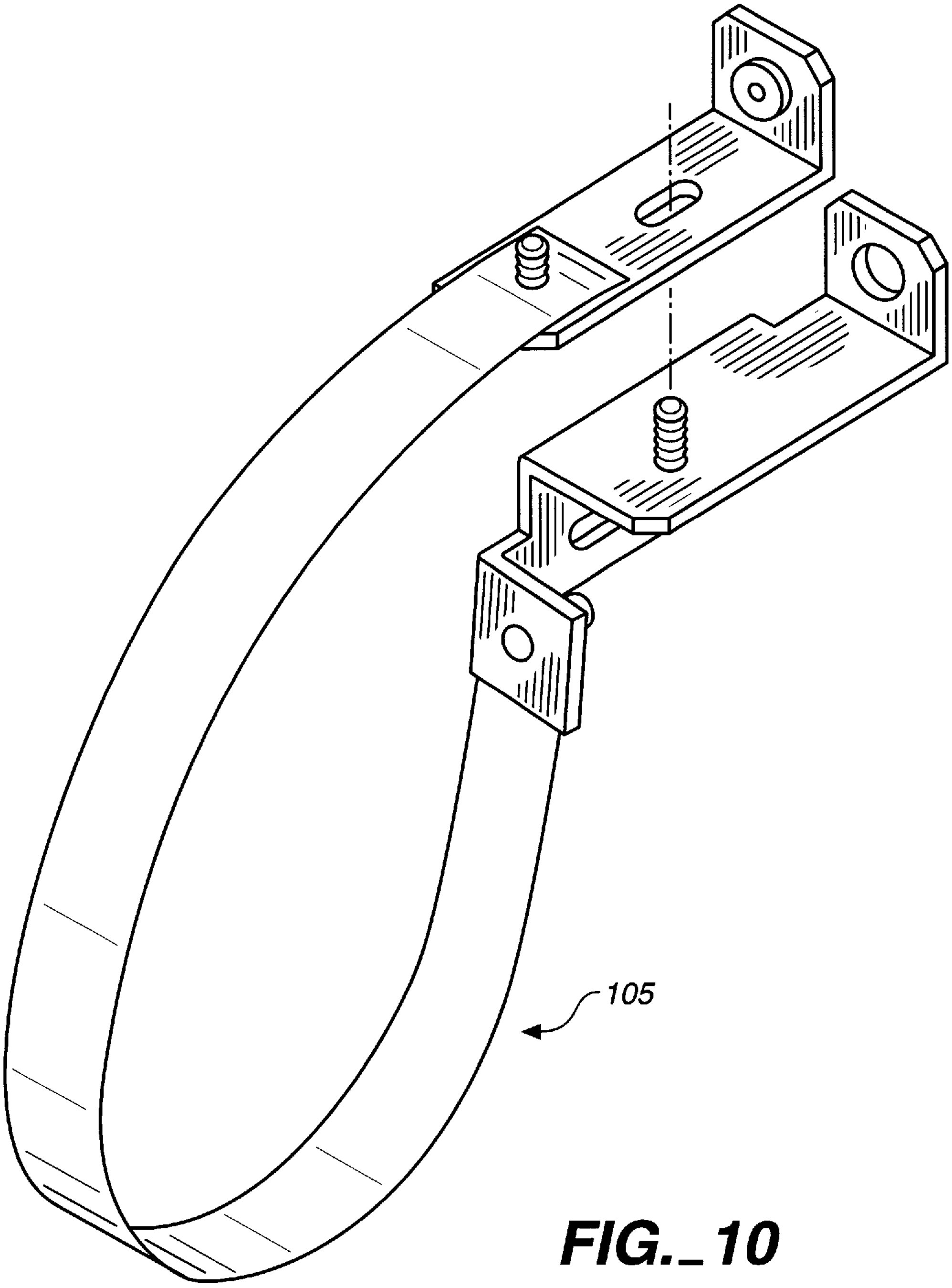
FIG. 10 is a perspective view of a brake for a drive device for an apparatus for intermittently advancing a web according to an embodiment of the present invention.

To prevent backlash that would typically be expected to occur when an operating cycle of the motor 99 ends and that might cause the web 23 to move in a direction opposite the intended direction of travel of the web, as seen in FIG. 9, a brake 105 is preferably provided to contact a portion 107 of the drive roller 29. The brake 105 is preferably in constant contact with the portion 107 of the drive roller 29 and is further preferably of a type that, when the drive roller is advanced, is self-tightening, i.e., it increases a braking effect such that, when the advancement of the drive roller ceases, the braking effect of the brake is at a maximum level to prevent backlash. A suitable brake 105 is a band brake or a wrap-spring brake as seen in FIG. 10 that surrounds the portion 107 of the drive roller 29 and that is placed in tension as the drive roller is advanced so that the brake provides a maximum braking effect when the drive roller is finished advancing. The brake 105 is preferably also of the type that offers no resistance during a rewinding operation. The portion 107 of the drive roller 29 that contacts the brake 105 is preferably a type of plastic that could be described as "self-lubricating" in the sense that a coefficient of friction between the portion of the drive roller and the brake does not increase substantially with time or use.

A coefficient of friction between the drive roller 29 and the web 23 is preferably greater than a coefficient of friction between the first roller 37 and a coefficient of friction between the web and than the second roller 47 and the web so that the web does not slide relative to the drive roller when the first or second rollers are moved between their first and second positions. The drive roller 29 preferably includes a rubber surface 109 that is intended to contact the first side 31 of the web 23 and the first roller 37 and the second roller 47 are preferably made of a highly polished or stainless steel.

Typical operation of the apparatus 21 in an ink jet printing apparatus proceeds as follows. As seen in FIG. 2, a paper roll 77 is loaded onto the reel 75. The width sensor detects the width of the roll 77 and sends a signal to the vacuum source 59, or a controller therefor, to develop a particular vacuum level corresponding to the width of the roll. The web 23 from the roll is fed through the apparatus around the first roller 37 and the third roller 65, across the flat surface 57 of the vacuum platen 55 (shown by dotted lines in FIG. 3), over the drive roller 29 (FIG. 4), around the fourth roller 67 and the second roller 47, and wound onto the second driven reel 79 to begin the take-up roll 81 (FIG. 5). Only the first surface 31 of the web 23 contacts the rollers 37, 65, 29, 67, and 47 or the flat surface 57 of the vacuum platen 55.

Depending upon the maximum safe operating tension in the paper web 23, the maximum permissible movement of the first and second rollers 37 and 47 toward their respective second points 39B and 49B against their respective urging devices 41 and 51 is ascertained, such as from trial and error or based on calculations that are functions of factors including manufacturer's specifications for the paper. This information and other information including paper width and initial roll diameter is input into a controller 73 so that the supplying of the web 23 from the reel 75 of the supply device 25 and take-up of the web 23 onto the reel 79 of the take-up device 27 will be appropriately controlled.

As seen with reference to FIG. 1, when the apparatus 21 is turned on, a vacuum is created by the vacuum source 59 across the flat surface 57 of the vacuum platen 55 and holds the web 23 flat against the flat surface. The supplying device 25 supplies the web 23 from the roll 77 by rotating the reel 75 and the take-up device 27 takes up the web onto the roll 81 by rotating the reel 79. As the supplying device 25 supplies the web 23, the length of the portion of the web between the stationary drive roller 29 and the supplying device increases, and the first roller 37 is urged toward the first position 39A by the first urging device 41 to maintain tension in the portion of the web and isolate the portion of the web from the inertia of the rotating roll 77. As the take-up device 27 takes up the web 23, the length of the portion of the web between the stationary drive roller 29 and the take-up device decreases and the second roller 47 is urged toward the second position 49B (shown by dotted lines) against the force of the second urging device 51 to maintain tension in the web and isolate the portion of the web from the inertia of the rotating roll 81.

When the drive roller 29 is stationary, an operation is performed on the web 23 at the station 53. An ink jet printer head carriage 61 moves laterally across the web 23 and prints matter on the second surface 63 of the web, preferably both when the printer carriage moves left-to-right and right-to-left across the web. Nozzles mounted on the carriage 61 are preferably disposed approximately 1 mm from the paper as the printing occurs.

After the carriage 61 has moved back and forth across the web 23, the drive roller 29 is rotated by the step motor arrangement 97 to advance the web approximately 0.62 inches or 0.31 inches (15.75 mm or 7.87 mm). When the drive roller 29 rotates, the brake 103 tightens around the portion 105 of the drive roller so that, at the end of the rotation of the drive roller, the brake provides its maximum braking effect and prevents backward movement of the drive roller due to backlash from the step motor arrangement. When the drive roller 29 rotates through its predetermined arc of rotation, the portion of the web between the supply device 25 and the drive roller becomes shorter and the portion of the web between the drive roller and the take-up device 27 becomes longer. Accordingly, the first roller 37 is moved against the force of the first urging device 41 toward the second position 39B (shown by dotted lines) and the second roller 47 is moved by the force of the second urging device 51 toward the first position 49A. When the first roller 37 and the second roller 47 are moved sufficiently toward the second position 39B and the first position 49A, respectively, as detected by the signal generating devices 83 and 85, respectively, the controller 73 controls the supply device 25 and the and the take-up device 27 to supply and take-up the web, respectively, until the first roller and the second roller are moved to positions closer to the first position 39A and the second position 49B, respectively, to maintain desired tension levels in the web.

The angle through which the first and second dancer roller arrangements 33 and 43 pivot is preferably varied as the diameter of the rolls 77 and 81 change as paper is fed from the roll 77 and taken up by the roll 81 in order to maintain as close to a constant tension in the web 23 as possible. As paper is fed from a new roll 77, the diameter of which is known, the angle through which the first dancer roller arrangement 33 pivots is preferably greatest and the angle through which the second dancer roller arrangement 43 pivots is preferably smallest. As the diameters of the rolls 77 and 81 change, and the roll 77 becomes smaller and the roll 81 becomes larger, the angle through which the first dancer roller arrangement pivots 33 is preferably reduced and the angle through which the second dancer roller arrangement pivots is preferably increased. Because the changes in roll diameter result in changes in the angle between the points of supply and take-up and the wrap around angle of the paper around the first roller 37 and the second roller 47, i.e., the arc of the rollers in contact with the web, if the angles through which the first and second dancer roller arrangements 33 and 43 are not changed, the tension in the web necessary to move the first roller to the second position 39B may become too great, and the tension in the web generated by moving the second roller to its second position 49B may not be sufficient to prevent slipping of the web relative to the drive roller 29 or the vacuum platen 55. The angles through which the first and second dancer roller arrangements 33 and 43 are pivoted are preferably changed by the controller 73, which calculates correct pivot angles as a function of a number of revolutions of the supply reel 75, the drive roller 29, and the take up reel 79, which are preferably counted with optical encoders. The controller 73, for example, receives a count of a number of revolutions of the supply reel 75 until the first roller 37 moves to its first position 39A, and receives a count of the number of revolutions of the drive roller 29 and, from this information, estimates the diameter of the supply roll 77 and adjusts the pivot angle accordingly.

It is, of course, possible to embody the invention in specific forms other than those described above without departing from the spirit of the present invention. The embodiments shown are merely illustrative and should not be considered restrictive in any way. The scope of the present invention is given in the appended claims, rather than the preceding description, and all variations and equivalents which fall within the range of the claims are intended to be embraced therein.

What is claimed is:

1. An apparatus in which a web is intermittently advanced, comprising:

a driven supplying device for supplying a web of material;

a driven take-up device for taking up the web of material;

an intermittently driven drive roller, and a motor for intermittently rotating and stopping the drive roller as the supplying device supplies the web and as the take-up device takes up the web, the drive roller being disposed between the supplying device and the take-up device, a first surface of the web contacting the drive roller such that intermittent movement of the drive roller intermittently advances the web toward the take-up device;

a first dancer roller arrangement between the drive roller and the supplying device, the first dancer roller arrangement including a first pivot point, a first roller pivotable about the first pivot point between a first and a second position, and a first urging device for urging the first roller toward the first position, the first surface of the web contacting the first roller; and a second dancer roller arrangement between the drive roller and the take-up device, the second dancer roller arrangement including a second pivot point, a second roller pivotable about the second pivot point between a first and a second position, and a second urging device for urging the second roller toward the first position, the first surface of the web contacting the second roller, wherein, when the drive roller advances the web, a length of the web between the supplying device and the drive roller decreases and causes the first roller to move toward the second position of the first roller against a force from the first urging device and a length of the web between the drive roller and the take-up device increases such that the second urging device moves the second roller to the first position of the second roller, when the supplying device supplies the web, a length of the web between the supplying device and the drive roller increases such that the first urging device moves the first roller to the first position of the first roller, and, when the take-up devices takes-up the web, a length of the web between the drive roller and the take-up device decreases and causes the second roller to move toward the second position of the second roller against a force from the second urging device.

2. The apparatus as set forth in claim 1, further comprising a station for performing an operation on the web between at least one of the first dancer roller arrangement and the drive roller and the second dancer roller arrangement and the drive roller.

3. The apparatus as set forth in claim 2, wherein the station includes a vacuum platen having a flat surface against which the first surface of the web is held by a constant vacuum.

4. The apparatus as set forth in claim 3, wherein the station includes a printer carriage movable laterally with respect to a direction of movement of the web and disposed at a distance from the vacuum platen for printing on a second surface of the web.

5. The apparatus as set forth in claim 3, wherein a strength of the vacuum is adjustable to regulate tension in the web between the vacuum platen and the drive roller.

6. The apparatus as set forth in claim 1, wherein the first dancer roller arrangement includes a third roller substantially coaxial with the first pivot point and the second dancer roller arrangement includes a fourth roller substantially coaxial with the second pivot point, the first surface of the web contacting the third and fourth rollers.

7. The apparatus as set forth in claim 1, further comprising means for controlling the supplying of the web by the supply device and the take-up of the web by the take-up device.

8. The apparatus as set forth in claim 7, wherein the supplying device includes a first driven reel upon which a roll of material is disposed to be unwound to supply the web of material and the take-up device includes a second driven reel upon which the web of material is wound to form a roll.

9. The apparatus as set forth in claim 7, further comprising first means for generating a signal corresponding to a position of the first roller between the first and second position of the first roller, and second means for generating a signal corresponding to a position of the second roller between the first and second position of the second roller, the controlling means controlling the supplying of the web by the supply device in response to the signal corresponding to the position of the first roller and controlling the take-up of the web by the take-up device in response to the signal corresponding to the position of the second roller.

10. The apparatus as set forth in claim 9, wherein the first signal generating means includes a grayscale sensor mounted relative to the first pivot point and the second signal generating means includes a grayscale sensor mounted relative to the second pivot point.

11. The apparatus as set forth in claim 1, wherein the motor includes a step motor for intermittently driving the drive roller.

12. The apparatus as set forth in claim 11, further comprising a brake for preventing backlash from the step motor from rotating the drive roller against a direction of movement of the web after intermittently driving the drive roller.

13. The apparatus as set forth in claim 1, wherein the drive roller and the web have a greater coefficient of friction than the first roller and the web and than the second roller and the web.

14. The apparatus as set forth in claim 1, wherein the first urging device is a spring and the second urging device is a spring.

15. An apparatus in which a web is intermittently advanced, comprising:

a driven supplying device for supplying a web of material;

a driven take-up device for taking up the web of material;

an intermittently driven drive roller, and a motor for intermittently stopping and rotating the drive roller as the supplying device supplies the web and the take-up device takes up the web, the drive roller being disposed between the supplying device and the take-up device, a first surface of the web contacting the drive roller such that intermittent movement of the drive roller intermittently advances the web toward the take-up device;

a first tensioning device, the first tensioning device being disposed between the drive roller and the supplying device and contacting the first surface of the web such that substantially constant tension is maintained in the web during intermittent movement of the drive roller and during no intermittent movement of the drive roller;

a second tensioning device, the second tensioning device being disposed between the drive roller and the take-up device and contacting the first surface of the web such that substantially constant tension is maintained in the web during intermittent movement of the drive roller and during no intermittent movement of the drive roller.

16. The apparatus as set forth in claim 15, further comprising a station for performing an operation on the web between at least one of the first tensioning device and the drive roller and the drive roller and the second tensioning device.

17. A method in which a web is intermittently advanced, comprising the steps of:

supplying a web of material from a supply point;

taking up the web of material at a take-up point;

intermittently moving a portion of the web between the supply point and the take-up point away from the supply point and toward the take-up point and stopping movement of the web with a drive device as the web is supplied and taken up;

maintaining substantially constant tension in a portion of the web between the drive device and the supply point during intermittent movement of the web and during no intermittent movement of the web with a first tensioning device;

maintaining substantially constant tension in a portion of the web between the drive device and the take-up point during intermittent movement of the web and during no intermittent movement of the web with a second tensioning device, wherein the drive device, the first tensioning device, and the second tensioning device contact only one surface of the web.

18. The method as set forth in claim 17, comprising the further step of performing an operation on a first surface of the web at a point between the drive device and at least one of the first tensioning device and the second tensioning device.

19. The method as set forth in claim 18, wherein the drive device, the first tensioning device, and the second tensioning device contact only a second surface of the web.

20. The method as set forth in claim 17, wherein the first tensioning device includes a first dancer roller arrangement pivotable through a first angle from a first position to a second position against a spring, and the second tensioning device includes a second dancer roller arrangement pivotable through a second angle from a first position to a second position against a spring.

21. The method as set forth in claim 20, wherein the supply point of the web of material includes a supply roll of material and the take-up point of the web of material includes a take-up roll of material, and the supply point of the web of material and the take-up point of the web of material change positions as material is supplied from the supply roll and as material is taken up on the take-up roll of material, the method comprising the further step of changing the first and second angles as the supply point and the take-up point change positions.

22. The method as set forth in claim 21, wherein the first angle is decreased as the supply point changes as material is supplied from the supply roll and the second angle is increased as the take-up point changes as material is taken up by the take-up roll.

* * * * *